US011076718B2

(12) United States Patent
Borovicka

(10) Patent No.: US 11,076,718 B2
(45) Date of Patent: Aug. 3, 2021

(54) COOKING STONE APPARATUS WITH ROTATABLE COOKING SURFACE

(71) Applicant: Charcoal Companion Incorporated, Berkeley, CA (US)

(72) Inventor: Cory Thomas Borovicka, Oakland, CA (US)

(73) Assignee: Charcoal Companion Limited, Wan Chai (HK)

( * ) Notice: Subject to any disclaimer, the term of this patent is extended or adjusted under 35 U.S.C. 154(b) by 227 days.

(21) Appl. No.: 16/123,919

(22) Filed: Sep. 6, 2018

(65) Prior Publication Data

US 2019/0231123 A1    Aug. 1, 2019

Related U.S. Application Data

(60) Provisional application No. 62/623,434, filed on Jan. 29, 2018.

(51) Int. Cl.
*A47J 37/04* (2006.01)
*A47J 37/06* (2006.01)
*A47J 37/07* (2006.01)

(52) U.S. Cl.
CPC ......... *A47J 37/043* (2013.01); *A47J 37/0664* (2013.01); *A47J 37/0718* (2013.01); *A47J 37/0786* (2013.01); *A47J 37/0658* (2013.01)

(58) Field of Classification Search
CPC .. A47J 37/043; A47J 37/0664; A47J 37/0718; A47J 37/0786; A47J 37/0658
USPC ................. 126/25 R, 1 R; 99/340, 447, 422; 426/523
See application file for complete search history.

(56) References Cited

U.S. PATENT DOCUMENTS

| 5,398,666 | A | | 3/1995 | Smith | |
|---|---|---|---|---|---|
| 5,413,033 | A | * | 5/1995 | Riccio | A21B 1/02 126/19 R |
| 5,605,092 | A | * | 2/1997 | Riccio | A21B 1/28 126/273.5 |
| 6,250,210 | B1 | | 6/2001 | Moreth | |
| 7,655,884 | B2 | * | 2/2010 | Engelhardt | A21B 1/44 219/388 |
| 7,686,010 | B2 | * | 3/2010 | Gustavsen | F24B 1/003 126/273.5 |

(Continued)

OTHER PUBLICATIONS

YouTube video clip entitled "How to Assemble the Pizzeria Pronto Outdoor Pizza Oven", uploaded on Sep. 25, 2013 by user "The Companion Group". Retrieved from Internet: <https://www.youtube.com/watch?v=ZEKU_Y6noTk>. (Year: 2013).*

(Continued)

*Primary Examiner* — Jimmy Chou
(74) *Attorney, Agent, or Firm* — Beeson Skinner Beverly, LLP

(57) ABSTRACT

A cooking stone apparatus with a rotatable cooking surface for use in conventional ovens, barbecue grills and the like includes a stationary bottom support plate and a cooking stone rotatably supported on top of the stationary bottom support plate. The cooking stone has a perimeter edge with one or more engagement points for receiving a tangential force without slippage, such that when a tangential force is applied to any of the one or more engagement points, the cooking stone rotates about the perpendicular axis of the support plate.

19 Claims, 6 Drawing Sheets

(56) References Cited

U.S. PATENT DOCUMENTS

| | | | | |
|---|---|---|---|---|
| 8,578,927 | B2* | 11/2013 | Gustavsen | F24B 1/003 126/273.5 |
| D730,105 | S* | 5/2015 | Borovicka | D7/350.1 |
| 9,182,129 | B2* | 11/2015 | Dahle | A21D 8/06 |
| 10,238,236 | B2* | 3/2019 | Borovicka | A47J 37/0786 |
| 2005/0051157 | A1* | 3/2005 | Cuomo | A47J 36/36 126/275 R |
| 2007/0169636 | A1* | 7/2007 | Carlson | A47J 47/005 99/279 |
| 2010/0147281 | A1* | 6/2010 | Gustavsen | F24B 1/003 126/21 A |
| 2011/0214662 | A1* | 9/2011 | Contarino, Jr. | A47J 37/0786 126/25 R |
| 2011/0217434 | A1* | 9/2011 | Brady | A21D 8/02 426/292 |
| 2013/0276643 | A1* | 10/2013 | Krolick | A47J 37/0623 99/447 |
| 2014/0130788 | A1* | 5/2014 | Contarino, Jr. | A47J 37/067 126/25 R |
| 2014/0196609 | A1* | 7/2014 | Snyman | A47J 37/0658 99/340 |
| 2015/0027432 | A1* | 1/2015 | Contarino, Jr. | A47J 37/0704 126/25 R |
| 2015/0114238 | A1* | 4/2015 | Palermo | A47J 37/0623 99/401 |
| 2015/0157173 | A1* | 6/2015 | Jepsen | A47J 37/0745 126/25 AA |
| 2015/0164278 | A1* | 6/2015 | Kohler | A47J 37/0623 99/340 |
| 2015/0208669 | A1* | 7/2015 | Klock | A47J 37/0611 426/523 |
| 2015/0338104 | A1* | 11/2015 | Lipinski | A21D 8/06 426/496 |
| 2016/0095472 | A1* | 4/2016 | Dahle | F24C 15/16 99/447 |
| 2017/0014000 | A1 | 1/2017 | Minnich | |
| 2017/0020337 | A1* | 1/2017 | Borovicka | A47J 37/0786 |
| 2018/0110367 | A1* | 4/2018 | Baker | A47J 37/0786 |
| 2018/0325314 | A1* | 11/2018 | Walters | A47J 37/0786 |

OTHER PUBLICATIONS

YouTube video clip entitled "Outdoor Oven Conversion Kit for Pizzacraft Pizza Ovens", uploaded on Nov. 9, 2017 by user "The Companion Group". Retrieved from Internet: <https://www.youtube.com/watch?v=XtEGosGP6LM>. (Year: 2017).*

Pizzacraft Perfect Pizza Grilling Stone—PC0120. Amazon [online]. [retrieved on Sep. 14, 2020]. Retrieved from the Internet: <URL: https ://www.amazon.com/Pizzacraft-Perfect-Pizza-Grilling-Stone/ dp/B00DIC2SA2/ref=sr_1_25?dchild=1&keywords=rotating+stone &qid=1600090408&sr=8-25>. (Year: 2016).*

Pizzacraft PC0119 Thermabond Stone. Amazon [online]. [retrieved on Sep. 14, 2020]. Retrieved from the Internet: <URL: https://www.amazon.com/Pizzacraft-PC0119-Thermabond-Stone-14-Rotating/dp/ B06Y125ZXD/ref=pd_rhf_dp_p_img_1?_encoding=UTF8&psc=1 &refRID=5AK89HNKAXXG0Z4960TZ#customerReviews>(Month: Aug.) (Year: 2018).*

Pizzacraft. Amazon [online], [retrieved on Sep. 14, 2020], Retrieved from the Internet: <URL: https://www.pizzacraft.com/products/ rotating-pizza-stone>. (Year: 2020).*

* cited by examiner

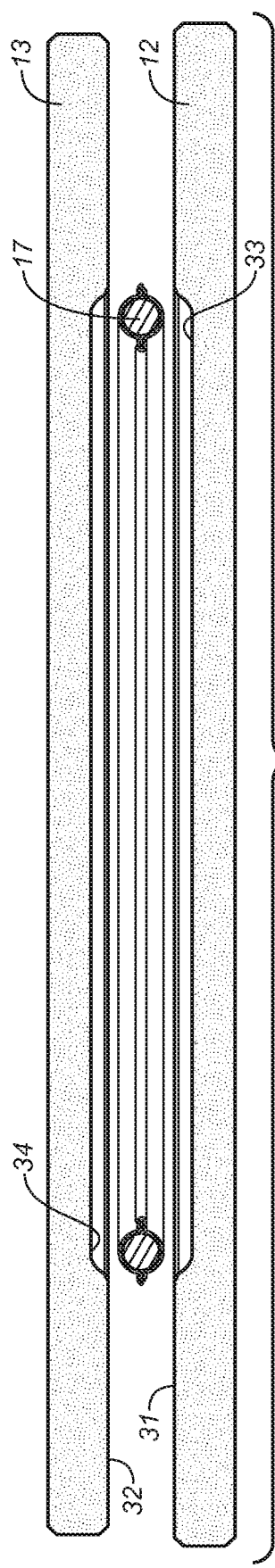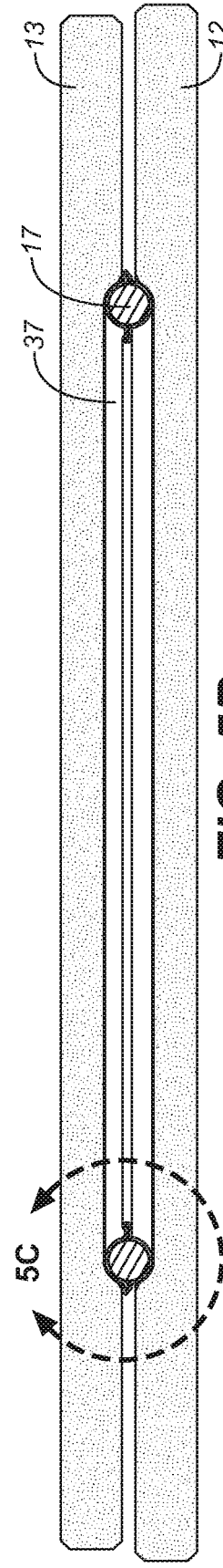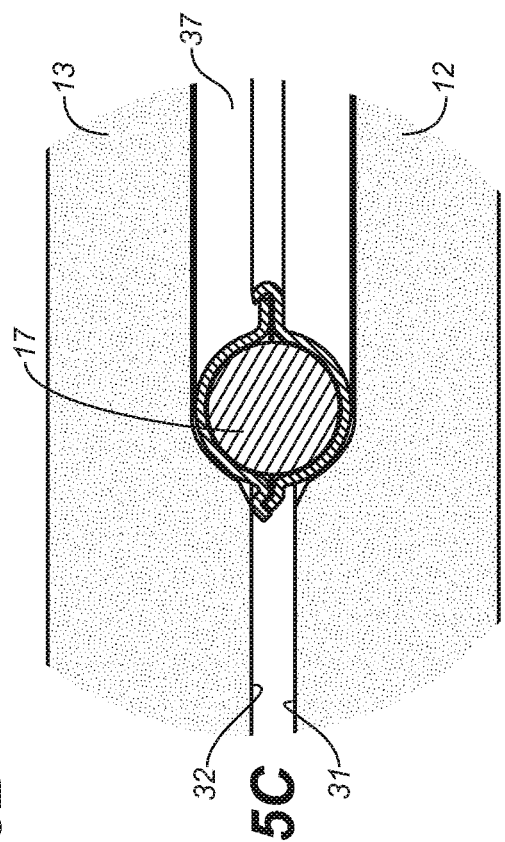
FIG. 5A
FIG. 5B
FIG. 5C

COOKING STONE APPARATUS WITH ROTATABLE COOKING SURFACE

CROSS-REFERENCE TO RELATED APPLICATION

This application claims the benefit of U.S. Provisional Patent Application No. 62/623,434 filed Jan. 29, 2018.

BACKGROUND

The present invention generally relates to cooking and baking accessories and more particularly to improvements in portable cooking surfaces, such as pizza stones, used in conventional ovens, barbecue grills and the like.

Pizza stones are portable cooking surfaces designed for baking pizzas in cooking ovens or barbecue grills. Due to their high thermal mass, pizza stones can evenly and efficiently distribute heat to the bottom of a pizza so that the bottom of the pizza is baked evenly. However, baking the top of the pizza evenly and to the same degree as the bottom of the pizza still presents challenges. One problem is that a pizza stone can deliver heat to the bottom of the pizza too efficiently, causing the bottom of the pizza to be overcooked relative to the top of the pizza. Another problem is that uneven heat distribution in the heating chamber above the pizza can cause uneven cooking across the top of the pizza. The solution to the latter problem is to intermittently reposition the pizza within the oven or barbecue grill. However, such repositioning is cumbersome and can be hazardous, generally requiring the pizza to be manually manipulated within the hot oven or barbeque grill with a hand tool such as a pizza peel.

The present invention overcomes the difficulty of repositioning a pizza or other food item within the heating chamber of an oven, barbecue grill or the like. The invention provides a portable cooking surface that can be easily and safely rotated or turned with a hand tool, thereby rotating or turning the pizza or food item supported on the cooking surface.

SUMMARY OF THE INVENTION

The present invention is directed to a cooking stone apparatus with a rotatable cooking surface for use in conventional ovens, barbecue grills and the like. The cooking stone apparatus includes a stationary bottom support plate and a cooking stone rotatably supported on top of the stationary support plate. The perimeter edge of the cooking stone has one or more engagement points for receiving a tangential force without slippage such that when a tangential force is applied to any one of the engagement points, the cooking stone rotates on the support plate about the perpendicular axis of the support plate.

BRIEF DESCRIPTION OF DRAWINGS

FIG. 5A is an exploded side elevation view of a cooking stone apparatus according to the invention.

FIG. 5B is a side elevation view of the cooking stone apparatus of FIG. 5A, showing the cooking stone apparatus fully assembled.

FIG. 5C is an enlarged partial cut-away view thereof, taken along section line 5C in FIG. 5B.

DETAILED DESCRIPTION OF ILLUSTRATED EMBODIMENT

Figure 1:
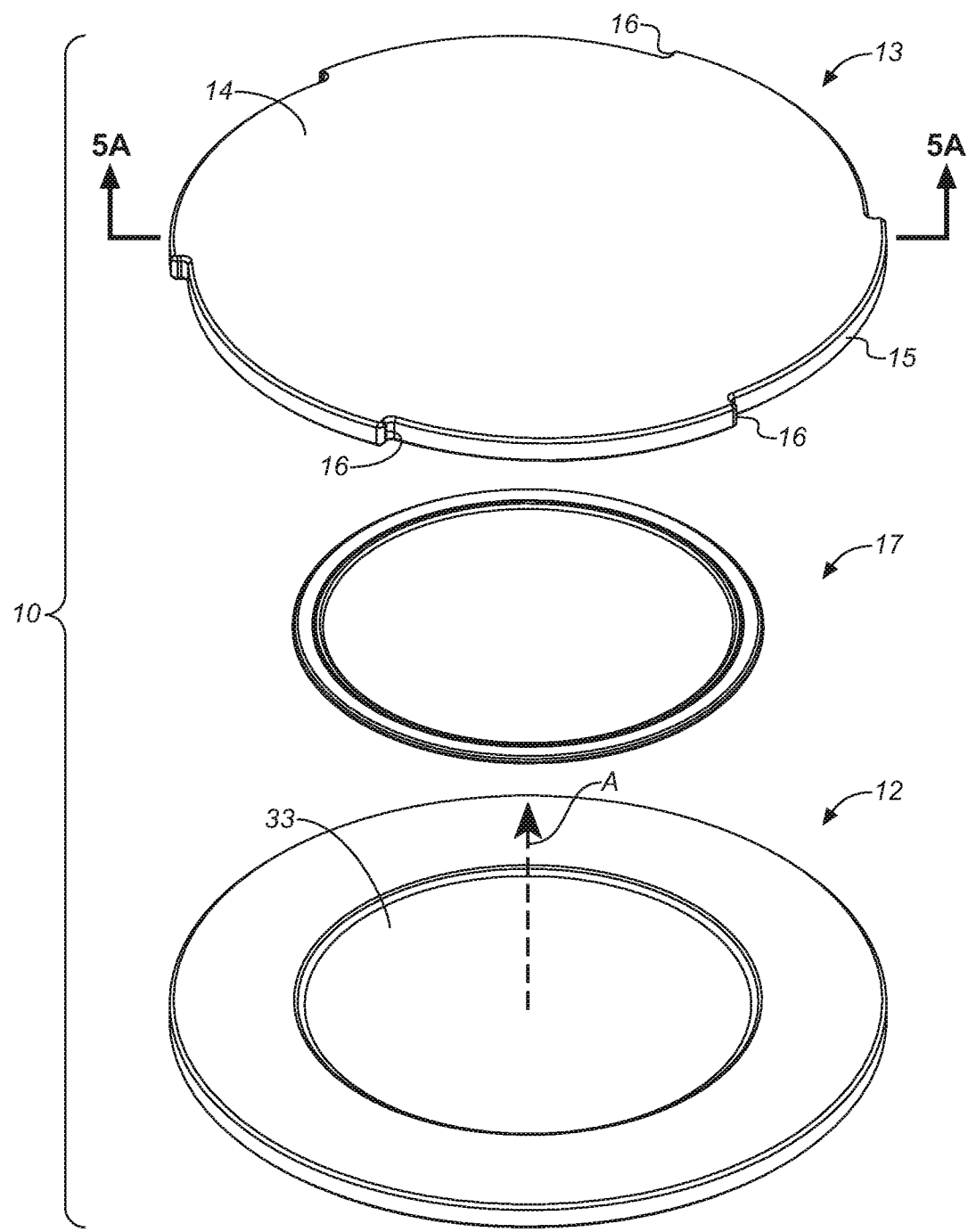
FIG. 1 is an exploded top perspective view of a cooking stone apparatus with a rotatable cooking surface according to the invention.

Referring now to the drawings, FIG. 1 shows a cooking stone apparatus 10 according to the invention that provides a rotatable cooking surface on which a pizza or other food item can be cooked. The illustrated cooking stone apparatus 10 is configured in size and shape for placement in the baking chamber of the portable pizza oven 20 illustrated in the drawings, but the invention can be sized and shaped for use in other cooking appliances such as a conventional oven or barbecue grill.

The cooking stone apparatus 10 includes a stationary bottom support plate 12, a cooking stone 13 and a bearing means in the form of a ring bearing 17 for rotatably supporting the cooking stone 13 on top of the support plate 12.

The support plate 12 is preferably substantially circular in shape with a centrally disposed surface indention 33 on its top surface that is sized and shaped to receive the ring bearing 17.

The cooking stone 13 is also preferably substantially circular in shape, with a top cooking surface 14 and a perimeter edge 15, and a diameter that substantially conforms to the diameter of the support plate 12. The cooking stone 13 has a centrally disposed surface indentation 34 on its bottom surface (shown in FIGS. 5A-6C) that is sized and shaped to conform to the surface indentation 33 on the top surface of the support plate 12 and sized and shaped to receive the top of the ring bearing 17. The surface indentations 33, 34 oppose each other when the cooking stone 13 is placed on top of the support plate 17. The ring bearing 17 is thus disposed within the gap formed between the two surface indentations 33, 34 (See the more detailed view in FIGS. 5A-6C).

A plurality of engagement points 16 are distributed substantially evenly about the perimeter edge 15 of the cooking stone 13, each of which is capable of receiving a tangential force without slippage. When the cooking stone 13 is supported on top of the support plate 12 and the ring bearing 17, and when a tangential force is applied to any of the engagement points 16, for example with a rotational tool, the cooking stone 13 rotates on the ring bearing 17 about the perpendicular axis A of the support plate 12.

In the illustrated embodiment, the cooking stone 13 has a saw-tooth perimeter edge 15 wherein the radial faces of the saw-tooth configuration provide the engagement points 16 used for rotating the cooking stone 13. However, it should be understood that the engagement points 16 can be provided in other configurations, for example, as indentations or protruding teeth.

In the illustrated embodiment, the bearing means 17 is a ring bearing, but it should be understood that any suitable mechanical element can be used for the bearing means, so long as the element enables free rotation of the cooking stone 13 on top of the support plate 12 about the perpendicular axis A of the support plate 12.

Figure 2:
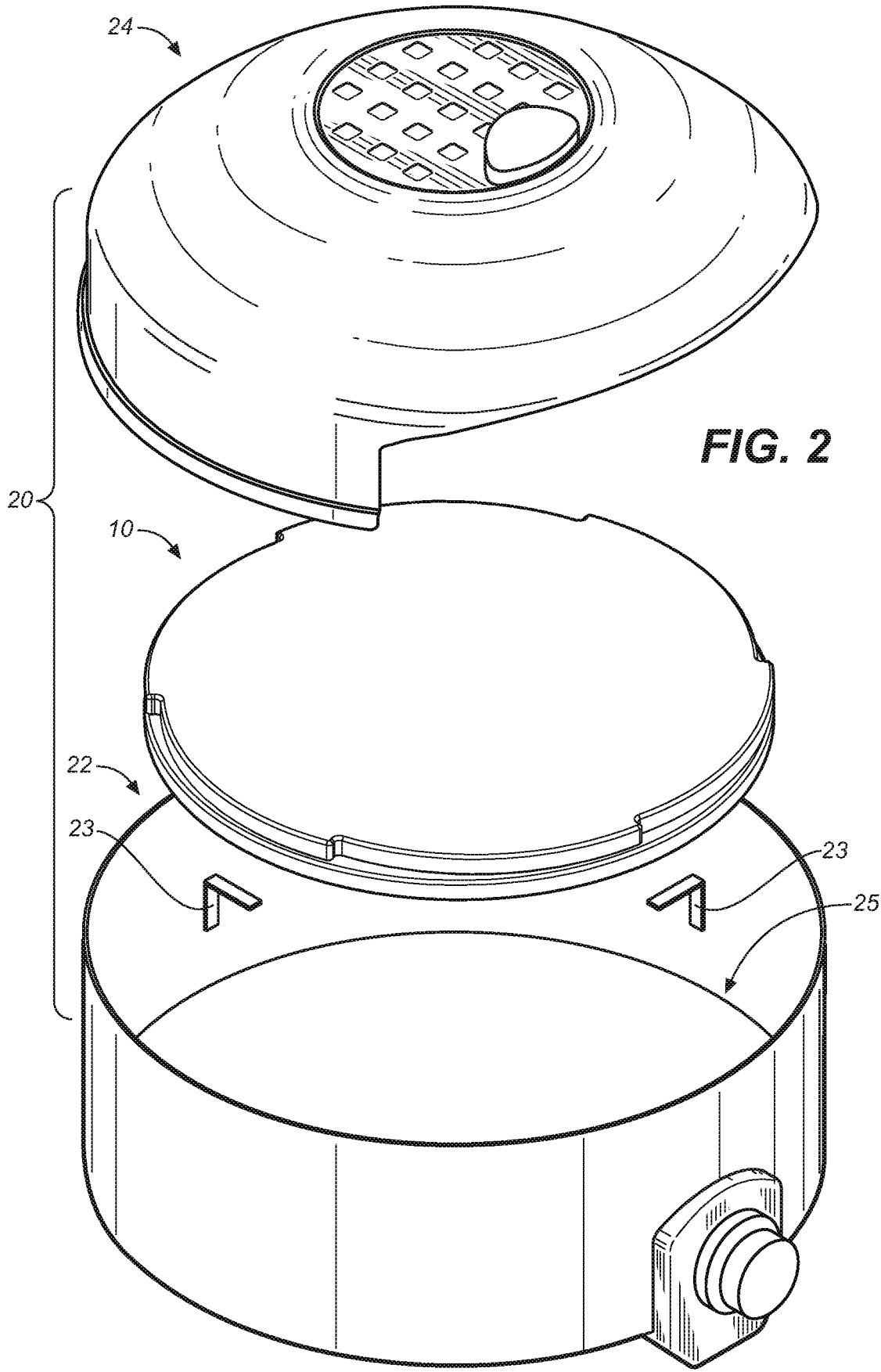
FIG. 2 is an exploded top perspective view of a portable pizza oven along with an assembled cooking stone apparatus such as that shown in FIG. 1.

FIG. 2 is an exploded perspective view of a portable pizza oven 20 with the cooking stone apparatus 10 of the invention. The illustrated pizza oven 20 includes a bottom base 22 and a top cover 24. The base 22 provides a lower baking chamber 25 above which the cooking stone apparatus 10 is placed. The lower baking chamber 25 can house a fixed heat source such as gas burners (not shown) or alternatively can be filled with a portable ignitable heat source such as charcoal briquettes. In the illustrated example, the cooking stone apparatus 10 is supported above the lower baking chamber 25 of the base 22 on support tabs 23 that protrude inwardly from the walls of the base 22 of the pizza oven 20. It should be understood that any suitable support structure can be used in place of support tabs 23 to support the cooking stone apparatus 10 above the lower baking chamber 25. Placement of the cover 24 on top of the base 22 and cooking stone apparatus 10 provides an upper baking chamber 26 above the cooking stone apparatus 10. In the illustrated portable pizza oven 20, the upper baking chamber 26 and cooking stone apparatus 10 disposed therein are accessible by a hand tool through an access opening 27.

Figure 3:
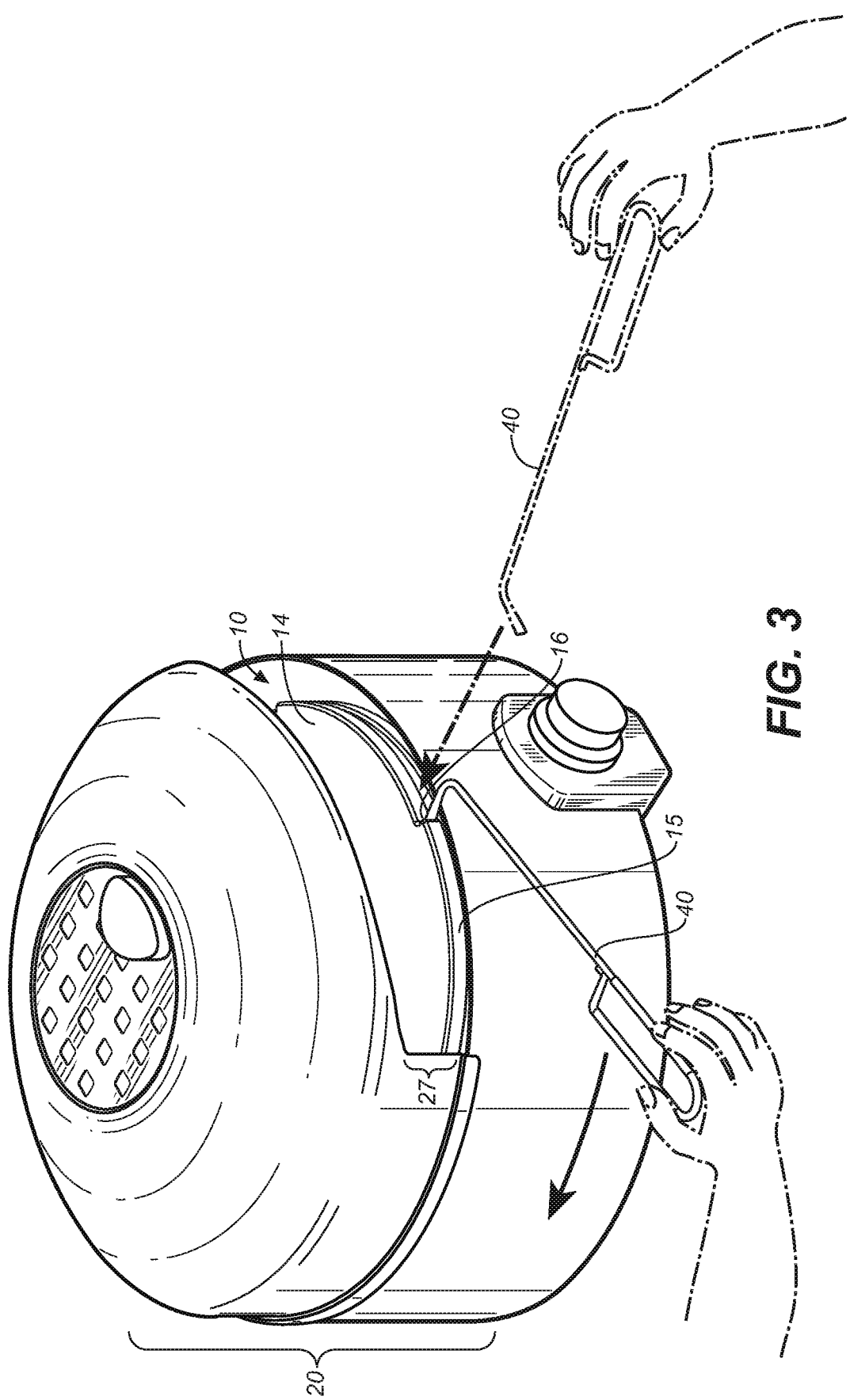
FIG. 3 is a top perspective view of the portable pizza oven shown in FIG. 2 with an assembled cooking stone apparatus disposed therein.
Figure 4:
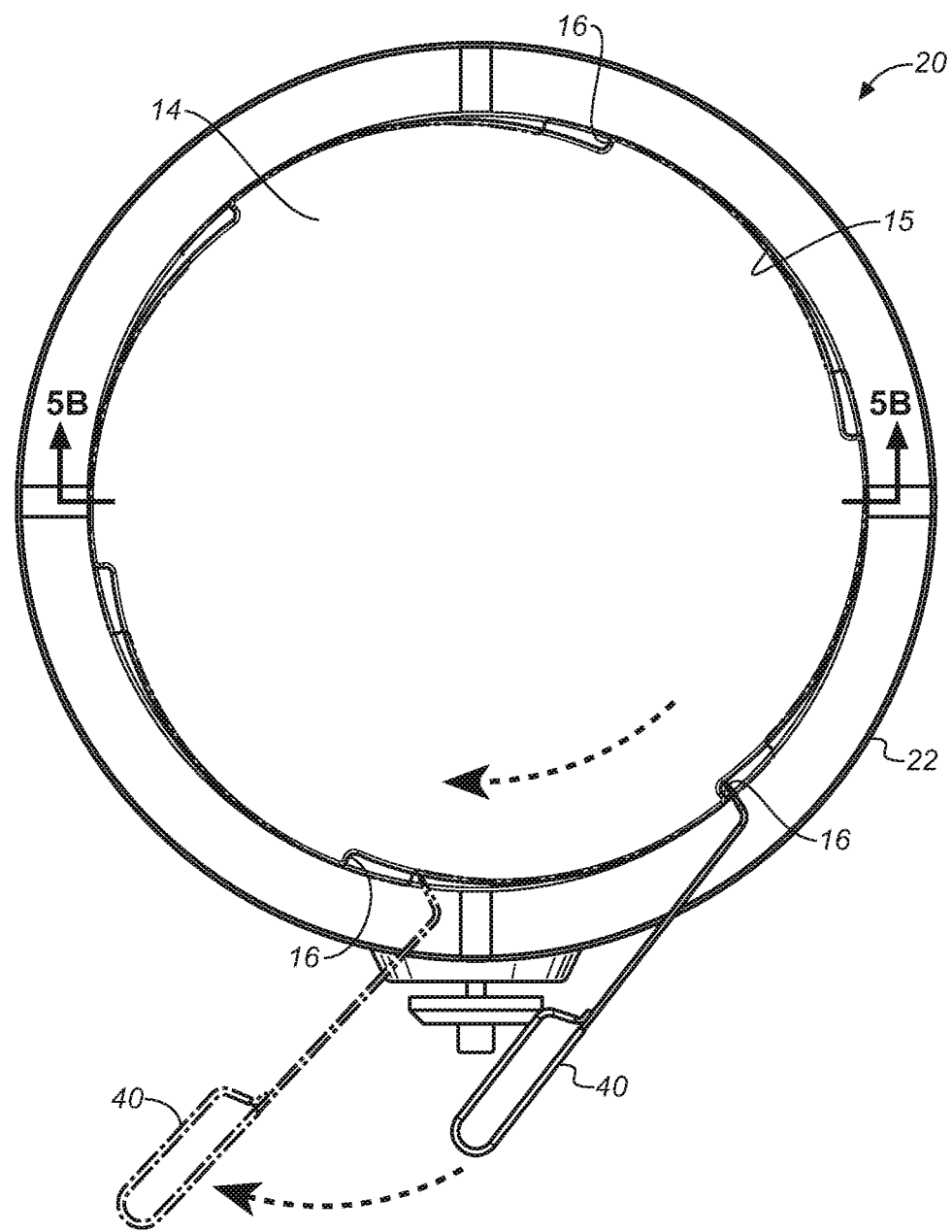
FIG. 4 is a top plan view of a cooking stone apparatus according to the invention supported within the base of a portable pizza oven.

Although the example of FIGS. 2-4 show the cooking stone apparatus 10 of the invention being used with a special-purpose portable pizza oven, the cooking stone apparatus 10 can be used in any type of oven or grill having a thermally insulated cooking chamber with an access opening. The access opening 27 may be always open, as in the illustrated pizza oven, or could be accessible by opening a door, as it would be in a conventional oven, or by removing a top cover, as it would be with a conventional kettle-style barbecue grill.

FIG. 3 illustrates a preferable method of using the cooking stone apparatus 10 of the invention using a hand tool 40. The illustrated hand tool 40 has a handle and a prong disposed on the end opposite the handle. The prong of the hand tool 40 is inserted through the access opening 27 of the portable pizza oven 20 and is used to apply tangential force to one of the engagement points 16 of the cooking stone 13 by either a pulling or pushing motion. Application of the tangential force causes the cooking stone 13 to rotate on the support plate 12 thereby rotating the cooking surface 14.

FIG. 4 is a top plan view of the cooking stone apparatus 10 as it is supported within the bottom base 22 of a portable pizza oven 20 and shows the same method of rotating the cooking stone 13 using a pronged hand tool 40 as shown in FIG. 3. The hand tool 40 enables a safe and convenient method of engaging the cooking stone apparatus 10.

Figure 6A:
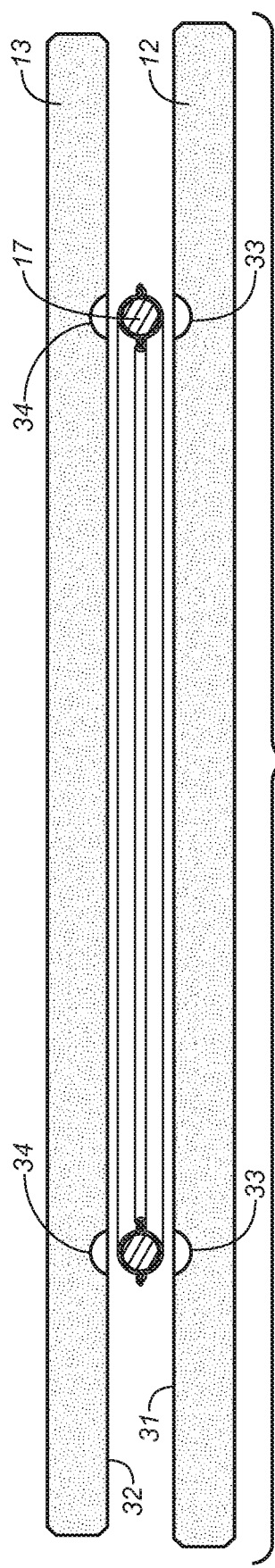
FIG. 6A is an exploded side elevation view of an alternative embodiment of a cooking stone apparatus according to the invention.
Figure 6B:
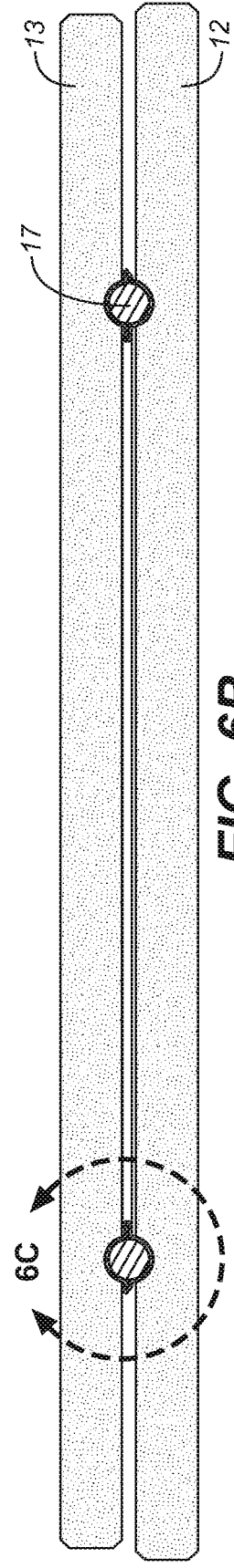
FIG. 6B is a side elevation view thereof, showing the cooking stone apparatus fully assembled.
Figure 6C:
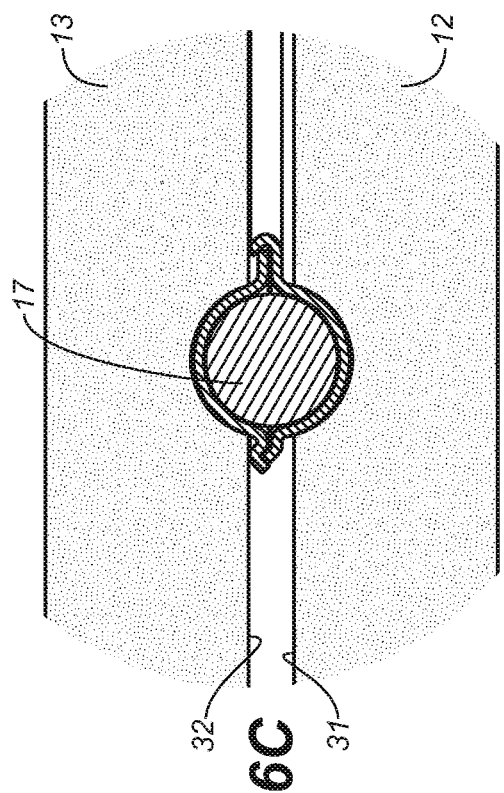
FIG. 6C is an enlarged partial cut-away view thereof, taken along section line 6C in FIG. 6B.

FIGS. 5A-5C are side elevation views of the cooking stone apparatus 10 of the invention showing in greater detail how the cooking stone 13 is supported by the ring bearing 17 on top of the support plate 12. Once the cooking stone apparatus 10 is assembled, the surface indention 33 on the top surface 31 of the support plate 12 opposes the surface indention 34 on the bottom surface 32 of the cooking stone 13 with the ring bearing 17 disposed therebetween. In the example illustrated in FIGS. 5A-5C, both surface indentions 33, 34 are substantially circular depressions that are sized and shaped to conform to one another and to fittingly accommodate the ring bearing 17 while providing a substantial air gap 37 between the support plate 12 and cooking stone 13. The air gap 37 helps to regulate heat transfer throughout the cooking stone 13, which otherwise has a tendency to heat more efficiently at its center than at its outer areas. FIGS. 6A-6C illustrate an alternative embodiment of the cooking stone apparatus 10 wherein the surface indentions 33, 34 are ring-shaped grooves sized and shaped in accordance with the size and shape of the ring bearing 17. In this embodiment there is only a minimal air gap between the support plate 12 and the cooking stone 13.

While the illustrated embodiments of the invention have been described in considerable detail in the foregoing specification, it is not intended that the invention be limited to such detail, except as may be necessitated by the claims of the application.

What I claim is:

1. A cooking stone apparatus for use in ovens and on barbecue grills, comprising:
    a stationary bottom support plate having an axis perpendicular thereto, and
    a cooking stone conforming in shape to said bottom support plate and rotatably supported on top of said stationary support plate such that the cooking stone can be rotated on top of the stationary support plate, said cooking stone having a top cooking surface and an outwardly facing perimeter edge,
    the outwardly facing perimeter edge of said cooking stone having a plurality of engagement points, each of which has a radial component protruding outwardly in a radial direction and spaced a distance apart configured to receive a force tangential to said perimeter edge wherein, when a user using a hand tool applies a tangential force to the radial component of any one of the engagement points, the cooking stone rotates on the support plate about the perpendicular axis of the support plate.

2. The cooking stone apparatus of claim 1 wherein bearing means are disposed between the cooking stone and stationary bottom support plate, and wherein the cooking stone is rotatably supported on top of said stationary support plate by the bearing means.

3. The cooking stone apparatus of claim 2 wherein said bearing means includes a ring bearing configured to be captured between the cooking stone and support plate when the cooking stone is placed on top of the support plate.

4. The cooking stone apparatus of claim 2 wherein:
    said cooking stone and stationary bottom support plate have opposable surfaces,
    the opposable surface of each of the cooking stone and stationary bottom support plate has a centrally disposed surface indentation,
    the surface indentations in the opposable surfaces of the cooking stone and stationary bottom support plate oppose each other when the cooking stone is placed on top of said support plate with the opposable surfaces thereof in opposition to each other, and
    the bearing means are disposed between said cooking stone and stationary bottom support plate such that the bearing means are captured within the centrally disposed surface indentations thereof when the cooking stone is placed on top of said support plate, the opposed surface indentations providing a center air gap between said cooking stone and stationary bottom support plate for regulating heat through the center portion of the cooking stone apparatus.

5. The cooking stone apparatus of claim 1 wherein the engagement points on the outwardly facing perimeter edge of said cooking stone are substantially evenly distributed about the perimeter edge of said cooking stone.

6. The cooking stone apparatus of claim 1 wherein the outwardly facing perimeter edge of said cooking stone has a plurality of substantially radial faces projecting outwardly from the cooking stone perimeter edge, said substantially radial faces forming engagement points on the outwardly facing perimeter edge of said cooking stone.

7. The cooking stone apparatus of claim 1 wherein both the cooking stone and support plate are circular in shape.

8. The cooking stone apparatus of claim 7 wherein the engagement points on the outwardly facing perimeter edge of said cooking stone are spaced apart by about 60 degrees around the perimeter edge of the cooking stone.

9. The cooking stone apparatus of claim 7 wherein the diameter of the circular cooking stone substantially conforms to the diameter of the circular support plate.

10. A cooking stone apparatus for use in ovens and on barbecue grills, comprising:
a circular stationary bottom support plate having a center axis, and
a circular cooking stone supported on top of said stationary support plate and being rotatable about the center axis thereof, said cooking stone having a top cooking surface and an outwardly facing saw-tooth perimeter edge, wherein the saw-tooth perimeter edge provides a plurality of radial sawtooth faces on the cooking stone's perimeter edge, wherein, when a user using a hand tool applies a tangential force to any one of the sawtooth faces on the outwardly facing perimeter edge, the cooking stone rotates on the support plate about the perpendicular axis of the support plate.

11. The cooking stone apparatus of claim 10 wherein the sawtooth faces on the outwardly facing perimeter edge of the cooking stone are evenly spaced apart around the perimeter edge of the cooking stone.

12. The cooking stone apparatus of claim 11 wherein the sawtooth faces on the outwardly facing perimeter edge of the cooking stone are spaced apart by about 60 degrees around the perimeter edge of the cooking stone.

13. The cooking stone apparatus of claim 10 wherein
said cooking stone and stationary bottom support plate have opposable surfaces,
the opposable surface of each of the cooking stone and stationary bottom support plate has a centrally disposed surface indentation,
the surface indentations in the opposable surfaces of the cooking stone and stationary bottom support plate oppose each other when the cooking stone is placed on top of said support plate, and
bearing means are disposed between the opposed cooking stone and stationary bottom support plate and captured within the surface indentations of the opposed cooking stone and stationary bottom support plate when the cooking stone is placed on top of said support plate.

14. The cooking stone apparatus of claim 13 wherein the opposed surface indentations have substantially the same diameter and provide a center air gap wherein the diameter of the surface indentations defines the lateral extent of the center air gap within the cooking stone apparatus.

15. The cooking stone apparatus of claim 14 wherein the bearing means is a ring bearing having a diameter corresponding to the diameter of the opposed surface indentations of the cooking stone and stationary bottom support plate such that the ring bearing fits within the opposed surface indentations.

16. A cooking stone apparatus for use in ovens and on barbecue grills, comprising:
a bottom support plate having a top surface,
a circular cooking stone having a bottom surface and a perimeter edge, and
a bearing ring disposed between said circular cooking stone and bottom support plate such that the circular cooking stone is rotatably supported on the bottom support plate by the bearing ring, wherein:
the top surface of the bottom support plate has an indentation sized to fittingly receive the bearing ring, said indentation having a depth such that the height of the received bearing ring extends above said indentation:
the bottom surface of the cooking stone has a circular indentation sized in correspondence with the bearing ring wherein, when the cooking stone is placed over the too of the bottom support plate, the circular indentation in the bottom surface of the cooking stone can be registered with the bearing ring so as to positionally fix the cooking stone over and in spaced relation above the bottom support plate, wherein the cooking stone can be rotated on the bearing ring, and
the cooking stone has a plurality of engagement points around its outer perimeter such that, when the cooking stone is placed over the bottom support plate on the bearing ring, application of a tangential force at any one of said engagement points by a user using a hand tool causes the cooking stone to rotate on the bearing ring about the perpendicular axis of the support plate.

17. The cooking stone apparatus of claim 16 wherein the engagement points around the outer perimeter edge of the cooking stone are in the form of radially projecting surfaces on the perimeter edge of the cooking stone.

18. The cooking stone apparatus of claim 17, wherein the top cooking stone and bottom support plate have a circular shape.

19. The cooking stone apparatus of claim 18, wherein the engagement points on the perimeter edge of the cooking stone are spaced apart by about 60 degrees around the perimeter edge of the cooking stone.

\* \* \* \* \*